United States Patent
Takizawa et al.

(10) Patent No.: US 7,122,936 B2
(45) Date of Patent: Oct. 17, 2006

(54) PHASE INSULATION PAPER AND ELECTRIC MOTOR PROVIDED WITH PHASE INSULATION PAPER

(75) Inventors: Keiji Takizawa, Toyota (JP); Kazuhiro Goto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/030,125

(22) Filed: Jan. 7, 2005

(65) Prior Publication Data

US 2005/0168097 A1 Aug. 4, 2005

(30) Foreign Application Priority Data

Jan. 30, 2004 (JP) .............................. 2004-024079

(51) Int. Cl.
*H02K 5/00* (2006.01)
*H02K 15/10* (2006.01)

(52) U.S. Cl. ...................................... 310/260; 310/270
(58) Field of Classification Search ................ 310/194, 310/215, 260, 270

See application file for complete search history.

(56) References Cited

U.S. PATENT DOCUMENTS

| | | | | |
|---|---|---|---|---|
| 4,403,162 A | * | 9/1983 | Pallaro | 310/194 |
| 5,659,219 A | * | 8/1997 | Momose et al. | 310/260 |
| 6,043,584 A | * | 3/2000 | DeHart | 310/260 |
| 2004/0183391 A1 | * | 9/2004 | Kimura et al. | 310/215 |

FOREIGN PATENT DOCUMENTS

| | | |
|---|---|---|
| JP | 63-314151 | 12/1988 |
| JP | 03-026254 | 3/1991 |
| JP | 05-048556 | 6/1993 |
| JP | 2003-319594 | 11/2003 |

* cited by examiner

*Primary Examiner*—Tran Nguyen
(74) *Attorney, Agent, or Firm*—Kenyon & Kenyon LLP (57) ABSTRACT

Three-dimensional portions are made of the same PET resin as are flat portions, only thicker. That is, the three-dimensional portions are more rigid than the flat portions. The three-dimensional portions are bonded to the flat portions at cutout portions thereof by a thermo-compression sheet or adhesive tape or the like. Connecting portions are made of PET resin that is thinner than the PET resin of which the flat portions are made. A phase insulation paper is provided in which the connecting portions are bonded at both ends to the flat portions, and an electric motor is provided in which the phase insulation paper is inserted between stator coils.

11 Claims, 11 Drawing Sheets

PHASE INSULATION PAPER AND ELECTRIC MOTOR PROVIDED WITH PHASE INSULATION PAPER

INCORPORATION BY REFERENCE

The disclosure of Japanese Patent Application No. 2004-024079 filed on Jan. 30, 2004 including the specification, drawings and abstract is incorporated herein by reference in its entirety.

BACKGROUND OF THE INVENTION

1. Field of the Invention

The invention relates to a phase insulation paper and an electric motor provided with the phase insulation paper. More particularly, this invention relates to a phase insulation paper that phase insulates coil ends of phase stator coils, and an electric motor which is phase insulated by that phase insulation paper.

2. Description of the Related Art

A stator in an electric motor typically has a stator core with a plurality of teeth on the inside surface, and coils wound around the teeth while forming coil ends at both end faces of the stator core. When the electric motor is a multiple phase alternating current motor, different phase coils must be phase insulated at the end face of the stator core where the coil ends of the phase coils come together.

As described in JP(A) 63-314151, phase insulation of the coil ends corresponding to the phase coils is typically performed by inserting a sheet of phase insulation paper between adjacent coil ends.

Electric motors and the like used in vehicles must be small. In order to make these electric motors more compact, the coil ends are press-formed to the stator core end face after the phase coils and phase insulation paper have been attached to the stator. During this press-forming, the coils deform greatly, particularly at a portion where they rise from slots (between adjacent teeth), such that the phase insulation paper greatly deforms three dimensionally.

The phase insulation paper disclosed in JP(A) SHO 63-314151 above does not take this large deformation that occurs during press-forming of the coil ends into consideration. As a result, when the coil ends are press-formed in order to make the electric motor more compact, the phase insulation paper becomes offset or damaged, which may result in poor phase insulation.

SUMMARY OF THE INVENTION

In view of the foregoing problems, this invention thus provides a phase insulation paper which has sufficient strength and which will not become offset, torn, or punctured from press-forming coil ends. The invention also provides a compact electric motor provided with a phase insulation paper that increases insulation quality due to the fact that it has sufficient strength and will not become offset, torn, or punctured from press-forming coil ends.

One aspect of the invention relates to a phase insulation paper that insulates two adjacent phases of coil ends formed by a plurality of stator coils at an end face of a stator core in a rotational axis direction. This phase insulation paper includes i) a three-dimensional portion provided corresponding to a first portion near where the coil ends enter/exit the stator core, the three-dimensional portion having a three-dimensional shape corresponding to the shape of the first portion when the coil ends have been press-formed to the end face, and ii) a flat portion provided corresponding to a second portion of the coil ends in a direction away from the stator core. The flat portion is formed of a first member and the three-dimensional portion is formed of a second member of higher rigidity than the first member.

Another aspect of the invention relates to a phase insulation paper that insulates two adjacent phases of coil ends formed by a plurality of stator coils at both end faces of a stator core in a rotational axis direction. This phase insulation paper includes a first flat portion and a first three-dimensional portion provided corresponding to the coil ends at one of the end faces, the first flat portion being formed from a first member and the first three-dimensional portion being formed from a second member that is more rigid than the first member; a second flat portion and a second three-dimensional portion provided corresponding to the coil ends at the other end face, the second flat portion being formed from the first member and the second three-dimensional portion being formed from the second member; and a connecting portion that connects the first flat portion and the second flat portion together and which is inserted into a slot of the stator core. The first three-dimensional portion and the second three-dimensional portion are both provided corresponding to a first portion near where the corresponding coil ends enter/exit the stator core, the first three-dimensional portion and the second three-dimensional portion both having a three-dimensional shape that corresponds with the shape of the first portion when the corresponding coil ends have been press-formed to the corresponding end face. The first flat portion and the second flat portion are both provided corresponding to a second portion of the corresponding coil ends in a direction away from the stator core.

During press-forming of the coil ends, the portions near where the corresponding coil ends enter/exit the stator core are subject to the most deformation and stress. According to the phase insulation papers described above, however, three-dimensional portions, or the first and second three-dimensional portions, are provided corresponding to the portion where the coils enter/exit the stator core and taking the shape and rigidity into account.

Accordingly, the phase insulation papers described above has sufficient strength and will not become offset from press-forming the coil ends.

Still another aspect of the invention relates to an electric motor that includes a stator; a plurality of stator coils, each stator coil being provided corresponding to a respective one of a plurality of phases and being wound around the stator; and a plurality of phase insulation papers, each of which is inserted between adjacent stator coils, which are the phase insulation papers described above.

Since the electric motor described above is provided with phase insulation papers that have sufficient strength and will not become offset from press-forming the coil ends, the electric motor is able to be made more compact while ensuring the insulation quality of the electric motor. Furthermore, this electric motor improves the manufacturing yield during press-forming of the coil ends when manufacturing the electric motor.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. Like or corresponding portions in the drawings will be denoted by the same reference numerals and descriptions thereof will not be repeated.

Figure 1:
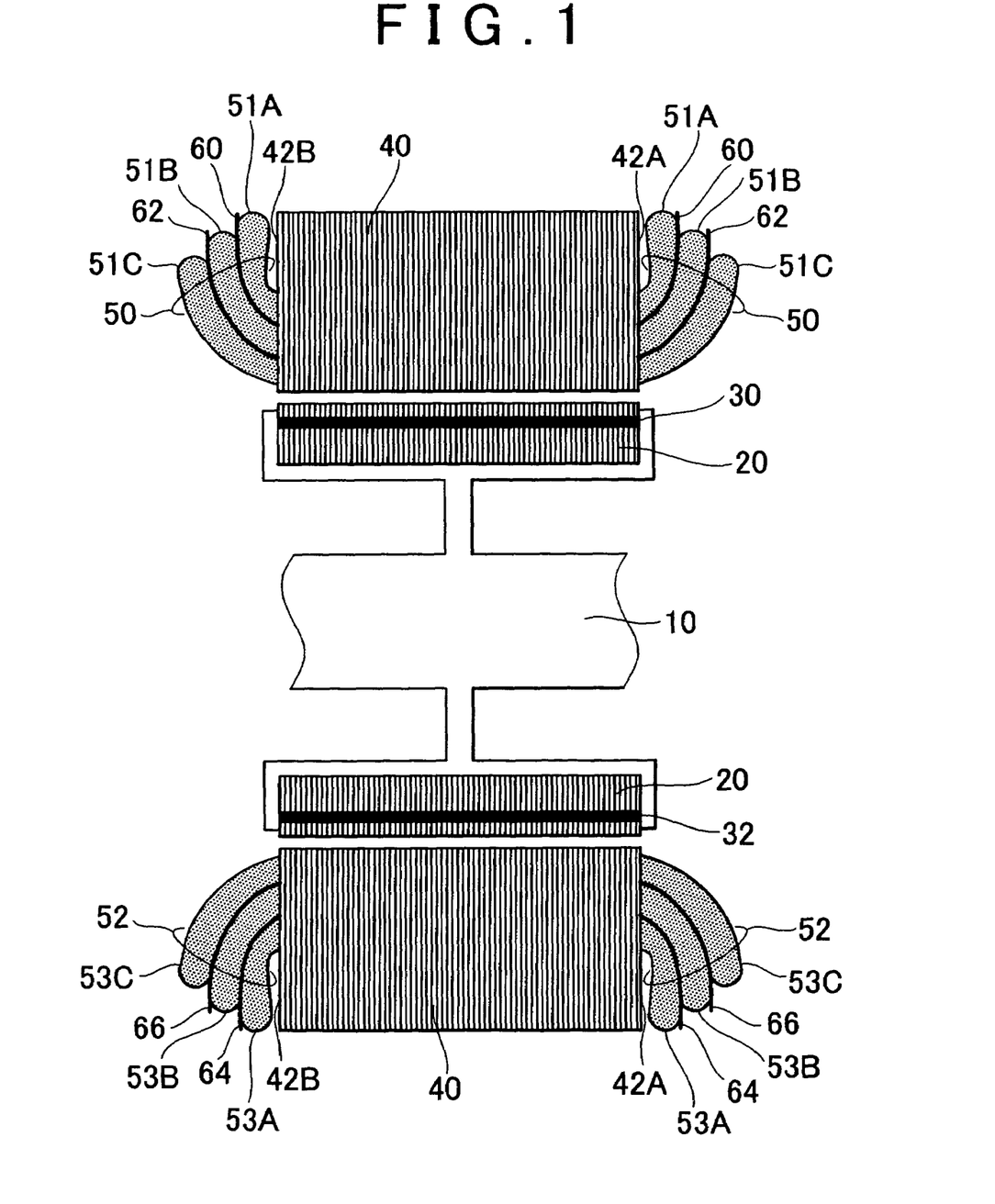
FIG. 1 is a sectional view schematically showing a cross-section of an electric motor, including its rotational axis, according to one exemplary embodiment of the invention.

FIG. 1 is a sectional view schematically showing a cross-section of an electric motor 100, including its rotational axis, according to one exemplary embodiment of the invention. Referring to FIG. 1, the electric motor 100 includes a rotor shaft 10, a rotor core 20, magnets 30 and 32, a stator core 40, coils 50 and 52, and phase insulation papers 60 to 66. The coil 50 includes a U phase coil 51A, a V phase coil 51B, and a W phase coil 51C. The coil 52 includes a U phase coil 53A, a V phase coil 53B, and a W phase coil 53C.

The rotor core 20 is formed by stacking electromagnetic steel plates in the direction of the rotational axis and crimping them together. The steel plates have holes in an outer peripheral portion into which the magnets 30 and 32, which form rotor magnetic poles, are inserted. The rotor core 20 is provided around, and fixed to, the rotor shaft 10. Accordingly, the rotor core 20 rotates around the rotational axis together with the rotor shaft 10.

The stator core 40 is formed by stacking the electromagnetic steel plates in the direction of the rotational axis and crimping them together. The stator core 40 is then arranged around the outer periphery of the rotor core 20 with a gap therebetween, and fixed to a housing (not shown) of the electric motor 100. The U phase coils 51A and 53A, the V phase coils 51B and 53B, and the W phase coils 51C and 53C are each wound around the stator core 40, thus forming stator magnetic poles.

The phase insulation paper 60 is then inserted between the coil end of the U phase coil 51A and the coil end of the V phase coil 51B at the end faces 42A and 42B of the stator core 40, thereby insulating the V phase coil 51B from the U phase coil 51A. The phase insulation paper 62 is inserted between the coil end of the V phase coil 51B and the coil end of the W phase coil 51C, thereby insulating the W phase coil 51C from the V phase coil 51B. Similarly, the phase insulation paper 64 is inserted between the coil end of the U phase coil 53A and the coil end of the V phase coil 53B, thereby insulating the V phase coil 53B from the U phase coil 53A. The phase insulation paper 66 is inserted between the coil end of the V phase coil 53B and the coil end of the W phase coil 53C, thereby insulating the W phase coil 53C from the V phase coil 53B.

After the U phase coils 51A and 53A, the V phase coils 51B and 53B, and the W phase coils 51C and 53C have been wound around the stator core 40 and the phase insulation papers 60 to 66 inserted, they are then press-formed to the end faces 42A and 42B of the stator core 40 such that the coil ends extend to the outer peripheral sides of the stator core 40. Press-forming the coil ends of the U phase coils 51A and 53A, the V phase coils 51B and 53B, and the W phase coils 51C and 53C here does deform the phase insulation papers 60 to 66. As will be described later, however, the phase insulation papers 60 to 66 have a three-dimensional nose shape that corresponds to a portion of each coil that rises from the stator core 40, where deformation will be particularly great. The three-dimensional nose shape takes into account the shape of that rising portion after press-forming. Furthermore, that portion (i.e., the nose shaped portion) is formed of a separate material which has a higher rigidity than the other portions. Therefore, the phase insulation papers 60 to 66 will not become offset or damaged by press-forming of the coil ends in this electric motor 100. As a result, the electric motor 100 is able to be made compact by press-forming the coil ends while maintaining insulation performance between the phase coils.

Figure 2:
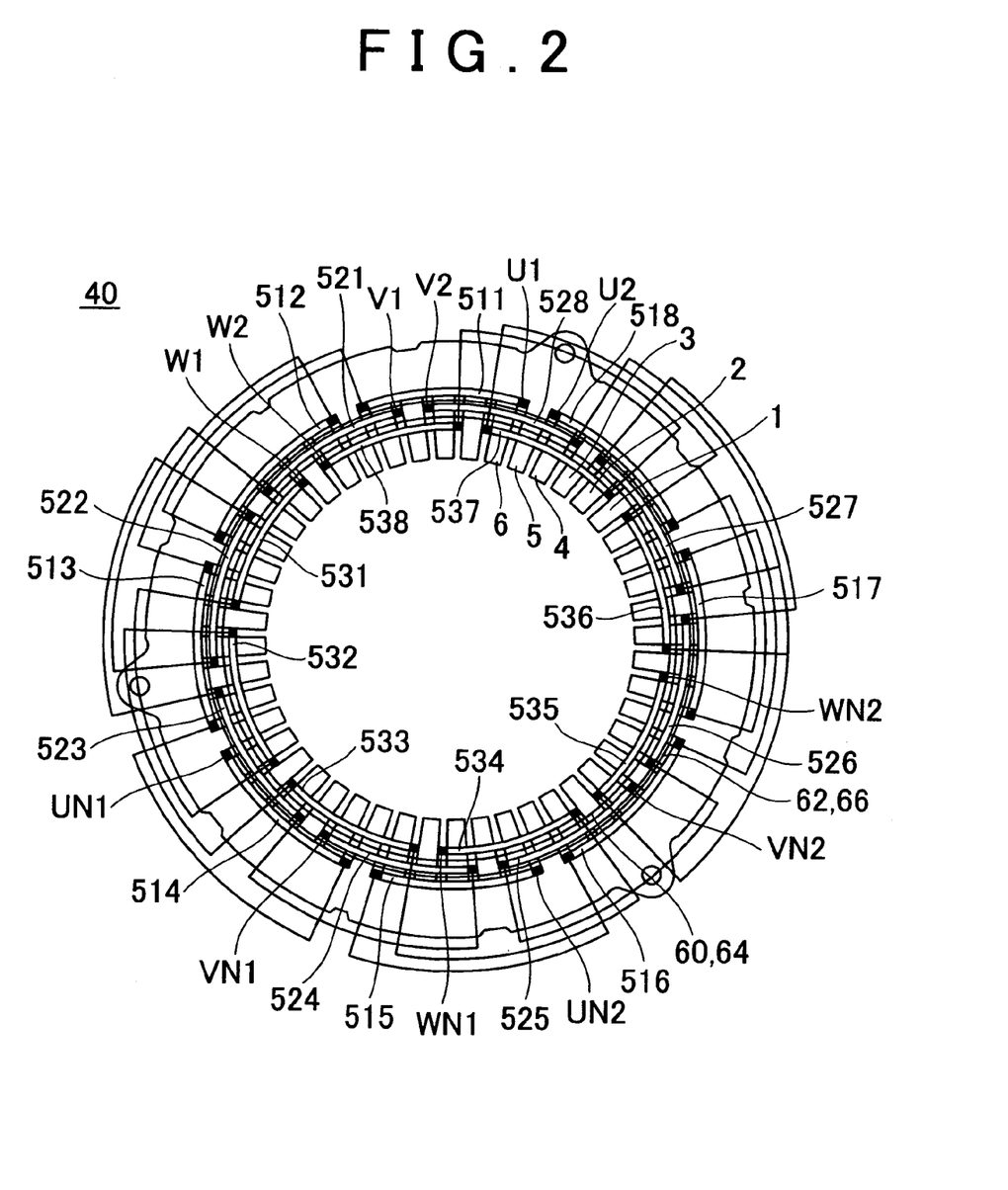
FIG. 2 is a plan view of a stator core shown in FIG. 1 as viewed from an end face 42A side.

FIG. 2 is a plan view of the stator core 40 shown in FIG. 1 as viewed from the end face 42A side. Referring to FIG. 2, coils 511 to 518 constitute the U phase coils 51A and 53A, coils 521 to 528 constitute the V phase coils 51B and 53B, and coils 531 to 538 constitute the W phase coils 51C and 53C. The coils 511 to 518 are arranged on the outermost periphery. The coils 521 to 528 are arranged in positions to the inner peripheral side of the coils 511 to 518 and offset by a predetermined distance in the circumferential direction with respect to the coils 511 to 518. Similarly, the coils 531 to 538 are arranged in positions to the inner peripheral side of the coils 521 to 528 and offset by a predetermined distance in the circumferential direction with respect to the coils 521 to 528.

The phase insulation paper 60 and 64 are inserted between the coils 511 to 518 and the coils 521 to 528. In FIG. 2, the phase insulation papers 60 and 64 appear to be continuous in the circumferential direction. In actuality, however, they are divided into a plurality of sheets of phase insulation paper including the phase insulation papers 60 and 64. Similarly, the phase insulation papers 62 and 66 are inserted between the coils 521 to 528 and the coils 531 to 538. In the drawing, the phase insulation papers 62 and 66 also appear to be continuous in the circumferential direction. In actuality, however, they are divided into a plurality of sheets of phase insulation paper including the phase insulation papers 62 and 66.

The coils 511 to 518, 521 to 528, and 531 to 538 are all wound around a plurality of corresponding teeth. For example, the coil 537 is formed corresponding to teeth 2 to 6 and is wound a predetermined number of times around all of the teeth 2 to 6. The other coils as well are also formed wound a predetermined number times around all of the corresponding plurality of teeth, just like the coil 537.

The coils 511 to 514 are connected in series, with one end being a terminal U1 and the other end being a neutral point UN1. The coils 515 to 518 are also connected in series, with one end being a terminal U2 and the other end being a neutral point UN2. The coils 521 to 524 are also connected in series, with one end being a terminal V1 and the other end being a neutral point VN1. The coils 525 to 528 are also connected in series, with one end being a terminal V2 and the other end being a neutral point VN2. The coils 531 to 534 are connected in series, with one end being a terminal W1 and the other end being a neutral point WN1. The coils 535 to 538 are also connected in series, with one end being a terminal W2 and the other end being a neutral point WN2.

Figure 3:
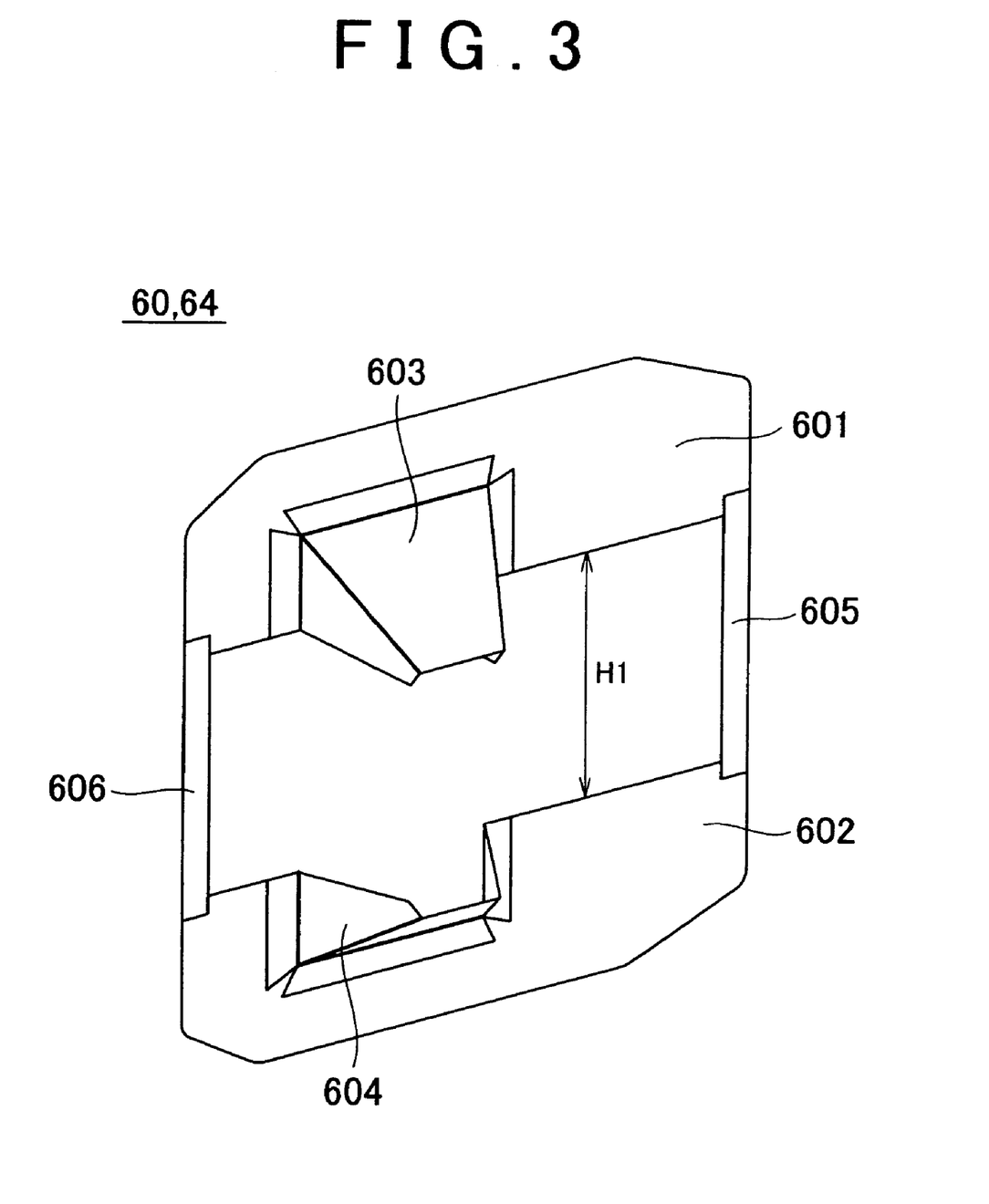
FIG. 3 is a projection plan view of a phase insulation paper to be inserted between a coil end of a U phase coil and a coil end of a V phase coil.

FIG. 3 is a projection plan view of the phase insulation papers 60 and 64 inserted between the coil end of the U phase coil and the coil end of the V phase coil.

Referring to FIG. 3, each phase insulation paper 60 and 64 includes flat portions 601 and 602, nose portions 603 and 604, and leg portions 605 and 606. The flat portions 601 and 602 are made of polyethylene terephthalate (hereinafter also referred to simply as "PET resin"), for example. This PET resin has excellent heat resistance and insulation properties in addition to having plasticity and a constant rigidity. Also, portions of the flat portions 601 and 602 which correspond to the nose portions 603 and 604 are cut out.

The nose portions 603 and 604 are separate members from the flat portions 601 and 602, but are formed of the same material (PET resin) as the flat portions 601 and 602, only thicker. The nose portions 603 and 604 are bonded to the flat portions 601 and 602 at the cutout portions. The nose portions 603 and 604 are firmly attached to the flat portions 601 and 602, respectively, with a thermo-compression sheet or adhesive tape, for example. The nose portions 603 and 604 are attached such that the portion of the coil rising from the stator core 40 at the coil end is covered from the inner peripheral side of the stator core 40, as will be described later.

The leg portions 605 and 606 are made of the same material (i.e., PET resin) as the flat portions 601 and 602, only thinner. The leg portions 605 and 606 are bonded at both ends to the flat portions 601 and 602, respectively, at both ends of the flat portions 601 and 602. These leg portions 605 and 606 are inserted into slots in the stator core 40. A gap H1 between the flat portions 601 and 602 that is determined by the leg portions 605 and 606 corresponds to the length, in the direction of the rotational axis, of the stator core 40.

The flat portion 601 constitutes a "first flat portion" and the flat portion 602 constitutes a "second flat portion". The nose portion 603 constitutes a "first three-dimensional portion" and the nose portion 604 constitutes a "second three-dimensional portion". The leg portions 605 and 606 both constitute "connecting portions".

With each of the phase insulation papers 60 and 64, the leg portions 605 and 606 are inserted into the slots in the stator core 40, and the flat portion 601 and the nose portion 603 are inserted between the coil ends of the U phase coil and the V phase coil at the end face 42A of the stator core 40. Similarly, the flat portion 602 and the nose portion 604 are inserted between the coil ends of the U phase coil and the V phase coil at the end face 42B of the stator core 40. At that time, the phase insulation papers 60 and 64 are attached so that the nose portions 603 and 604 correspond to the portion of the U phase coil rising from the stator core 40 and so that the protruding side of the nose portions 603 and 604 are on the inner peripheral side of the stator core 40.

Figure 4:
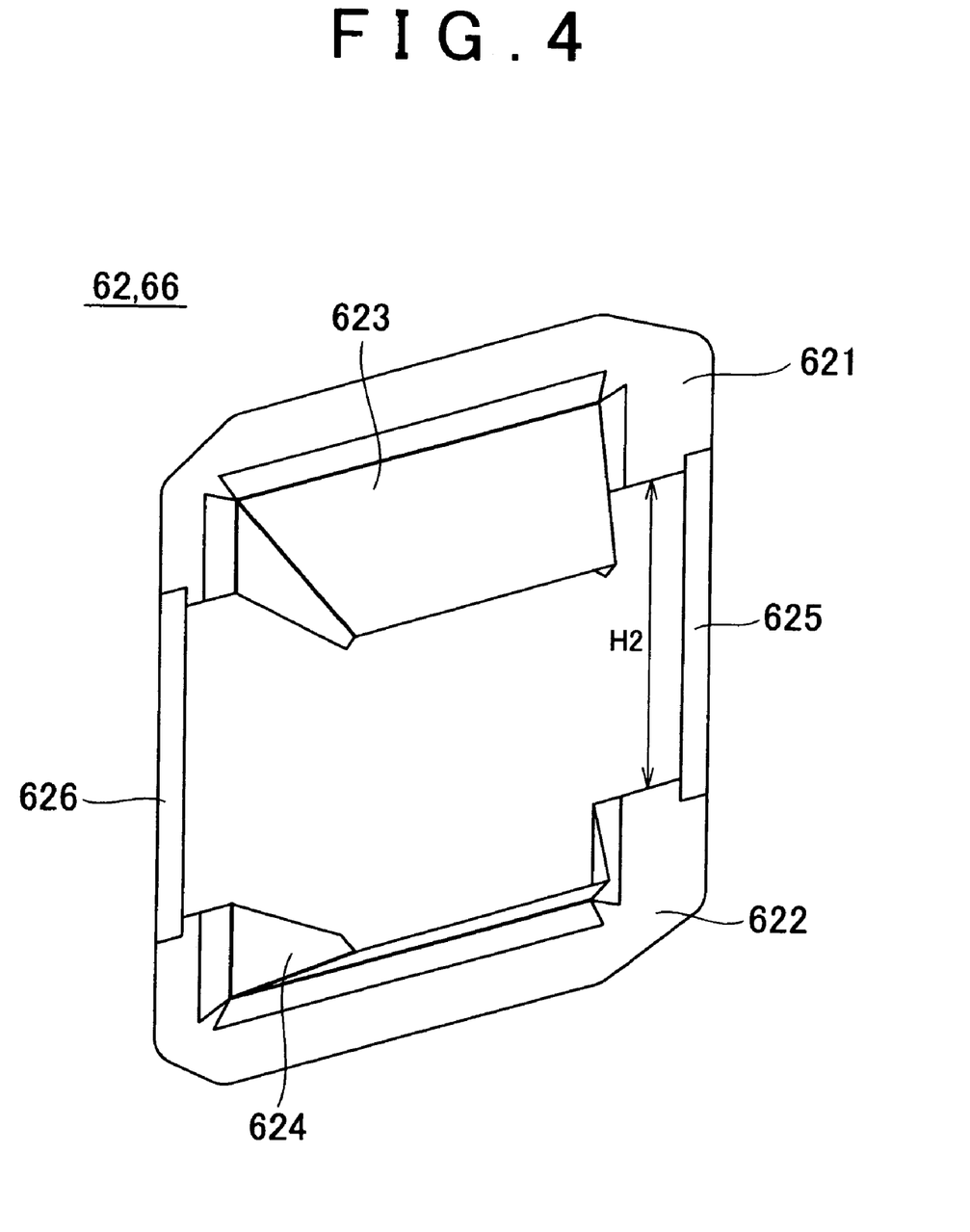
FIG. 4 is a projection plan view of a phase insulation paper to be inserted between a coil end of a V phase coil and a coil end of a W phase coil.

FIG. 4 is a projection plan view of the phase insulation papers 62 and 66 inserted between the coil end of the V phase coil and the coil end of the W phase coil.

Referring to FIG. 4, each of the phase insulation papers 60 and 64 includes flat portions 621 and 622, nose portions 623 and 624, and leg portions 625 and 626. The basic structure of the phase insulation papers 62 and 66 is substantially the same as that of the phase insulation papers 60 and 64 shown in FIG. 3. That is, the flat portions 621 and 622, the nose portions 623 and 624, and the leg portions 625 and 626 are each made of PET resin, for example, the nose portions 623 and 624 are thicker than the flat portions 621 and 622 and the leg portions 625 and 626 are thinner than the flat portions 621 and 622, and the nose portions 623 and 624 and the leg portions 625 and 626 are then bonded to the flat portions 621 and 622.

The phase insulation papers 62 and 66 differ from the phase insulation papers 60 and 64 shown in FIG. 3 in that the width of the nose portions is different. That is, the width of the nose portions 623 and 624 on the phase insulation papers 62 and 66 inserted between the coil end of the V phase coil and the coil end of the W phase coil is wider than the width of the nose portions 603 and 604 on the phase insulation papers 60 and 64 inserted between the coil end of the U phase coil and the coil end of the V phase coil. This is because when the coil ends are press-formed, the U phase coil is first formed on the outermost peripheral side, the V phase coil is formed to the inner peripheral side of the U phase coil, and the W phase coil is formed to the inner peripheral side of the V phase coil. Accordingly, the closer the coil is to the inner peripheral side, the earlier the portion of that coil that rises from the slot deforms in the circumferential direction.

A gap H2 between the flat portions 621 and 622 determined by the leg portions 625 and 626 is designed to be somewhat wider than the gap H1 in the phase insulation papers 60 and 64, taking into consideration the fact that the phase insulation papers 62 and 66 are arranged above the phase insulation papers 60 and 64 via the V phase coils at the end faces 42A and 42B of the stator core 40.

Figure 5:
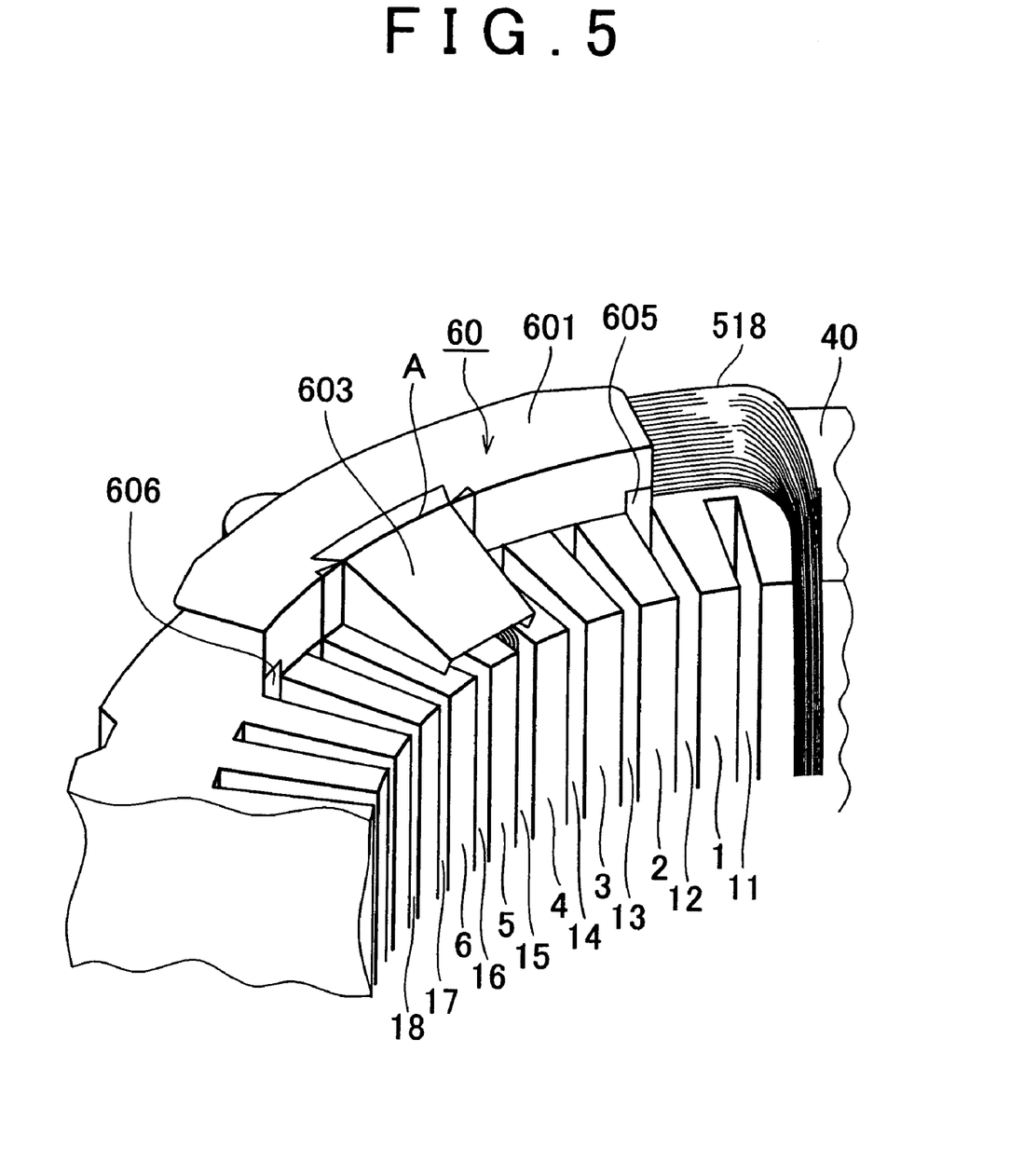
FIG. 5 is a perspective view illustrating one example of how the phase insulation paper shown in FIG. 3 is attached to the stator core shown in FIG. 2.
Figure 6:
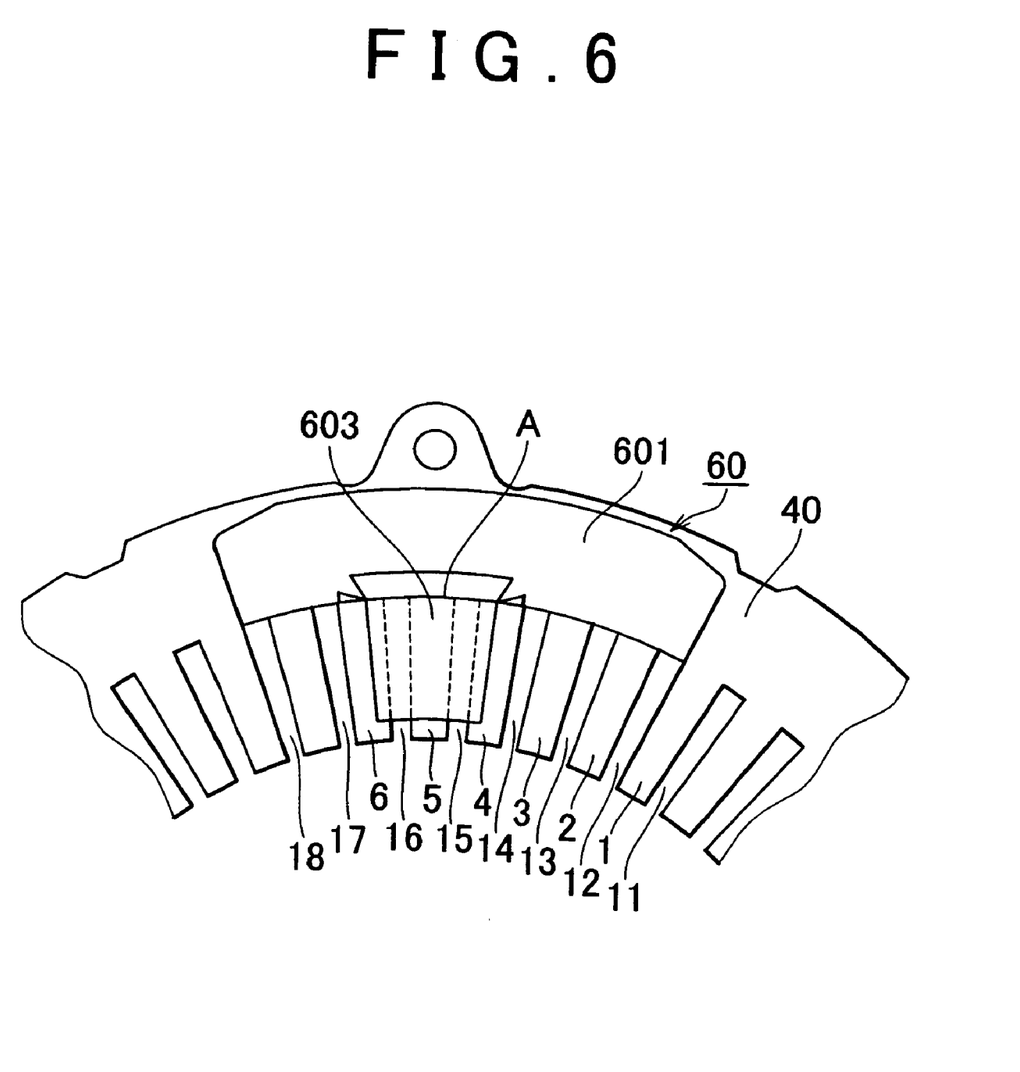
FIG. 6 is a plan view corresponding to FIG. 5, as viewed from the end face 42A side of the stator core.

FIG. 5 is a perspective view illustrating one example of how the phase insulation paper 60 shown in FIG. 3 is attached to the stator core 40 shown in FIG. 2. FIG. 6 is a plan view corresponding to FIG. 5, as viewed from the end face 42A side of the stator core 40. In FIG. 6, the area near the teeth 1 to 6 of the stator core 40 shown in FIG. 2 is shown expanded; the stator coil is not shown. Also, in FIGS. 5 and 6, a case is shown in which one sheet of the phase insulation paper 60 covers a portion of the coil end. In actuality, however, a plurality of sheets of the phase insulation paper 60 is provided with no gaps in between in the circumferential direction of the stator core 40.

Referring to FIGS. 5 and 6, the U phase coils 511 and 518 (the U phase coil 511 is not shown) are inserted into slots 16 and 15, respectively. After they rise up from the slots 16 and 15, they are then extended and press-formed to the outermost peripheral side of the end face 42A of the stator core 40. The leg portions 605 and 606 of the phase insulation paper 60 are inserted into slots 12 and 18, respectively, such that the nose portion 603 is arranged corresponding to the slots 16 and 15 into which the U phase coils 511 and 518 have been inserted.

Then, when the V phase coils 527 and 528 (not shown) provided farther to the inner peripheral side than the phase insulation paper 60 are extended and press-formed, the phase insulation paper 60 is formed together with the V phase coils 527 and 528, and sandwiched between the U phase coils 511 and 518 and the V phase coils 527 and 528 in the shape shown in the drawing. A mountain fold is made in the flat portion 601 along line A of the nose portion 603.

The coil end of the U phase coil 518 is formed generally planar at the portion in the circumferential direction of the stator core 40, but then greatly deforms three-dimensionally at the portion where it rises from the slot 15. Here, the nose portions 603 and 604 are provided on the phase insulation paper 60 taking into account in advance the shape of the rising portion of the coil after this kind of three-dimensional deformation. These nose portions 603 and 604 are separate members which are extremely rigid, taking into account the fact that they are subject to a large amount of deformation stress. As a result, the phase insulation paper will not become offset or damaged at the nose portions 603 and 604 during press-forming of the coil ends.

Further, as described above, the nose portions 603 and 604 and the flat portions 601 and 602 are formed as separate members on the phase insulation paper 60. The rigidity of the flat portions 601 and 602 corresponding to the portions where the coil ends are formed planar is not made unnecessarily high. This is because increasing the rigidity of the phase insulation paper adversely affects the ability to prevent the phase insulation paper from becoming offset, and if the rigidity of the flat portions 601 and 602 is increased like that of the nose portions 603 and 604, the amount of the phase insulation paper sticking out from the coil ends would increase, making it difficult to make the electric motor compact. Therefore, a large offset of the phase insulation paper at the flat portions 601 and 602 during press-forming is able to be avoided. Further, the flat portions 601 and 602 do not affect the ability to make the electric motor 100 compact.

Furthermore, the leg portions 605 and 606 and the flat portions 601 and 602 of the phase insulation sheet 60 are different members and the leg portions 605 and 606 that are inserted into the slots are made as thin as possible. As a result, the leg portions 605 and 606 do not impair the lamination factor of the coil inside the slots so the performance of the electric motor 100 will not degrade.

Figure 7:
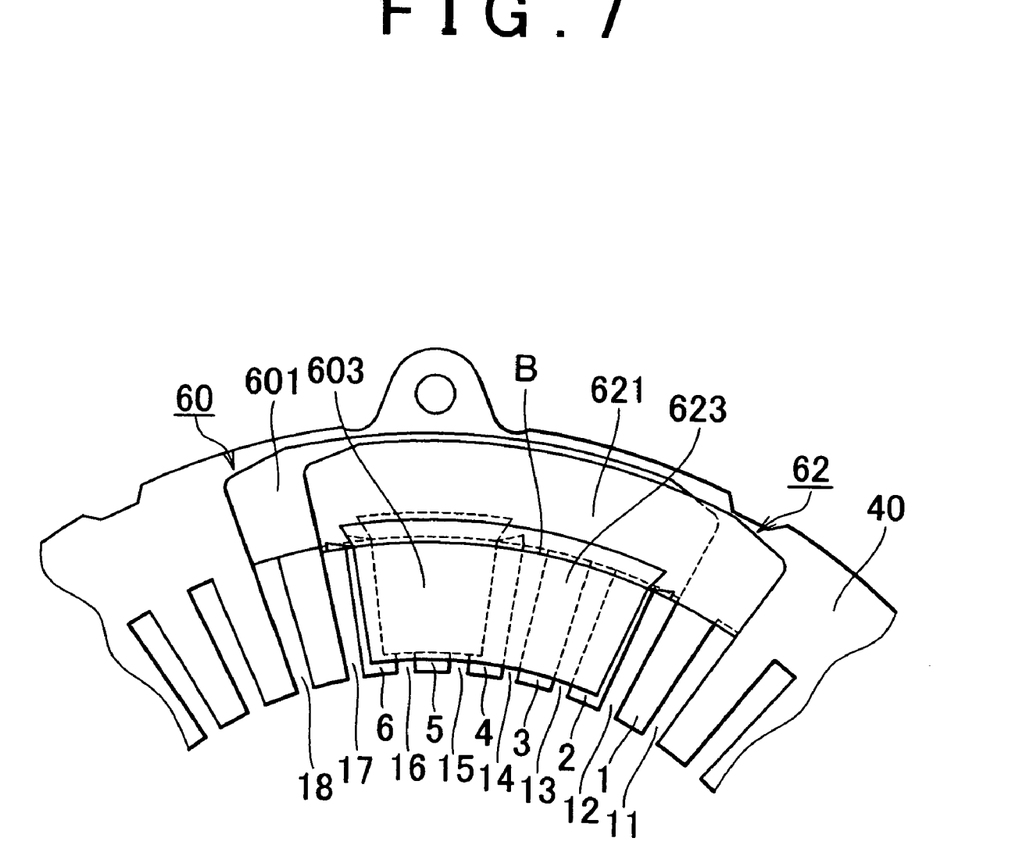
FIG. 7 is a plan view illustrating one example of how the phase insulation paper shown in FIG. 4 is attached to the stator core shown in FIG. 2.

FIG. 7 is a view illustrating one example of how the phase insulation paper 62 shown in FIG. 4 is attached to the stator core 40 shown in FIG. 2. In FIG. 7, a case is shown in which the phase insulation paper 62 is attached after the phase insulation paper 60 has been attached. Also, in FIG. 7 as well, a case is shown in which one sheet of the phase insulation paper 62 covers a portion of the coil end. In actuality, however, a plurality of sheets of the phase insulation paper 62 is provided with no gaps in between in the circumferential direction of the stator core 40.

Referring to FIG. 7, the V phase coils 527 and 528, not shown, are inserted into slots 13 and 14, respectively. After they rise up from the slots 13 and 14 (i.e., in the direction vertically upward from the paper on which the drawing is made), they are then extended and press-formed at the end face 42A of the stator core 40 on the inner peripheral side of the U phase coils 511 and 518. The leg portions 625 and 626 of the phase insulation paper 62 are inserted into slots 11 and 17, respectively, such that the nose portion 623 is arranged corresponding to both the slots 13 and 14 into which the V phase coils 527 and 528 have been inserted, and the nose portion 603 of the phase insulation paper 60.

Then, when the W phase coils 536 and 537 (not shown) provided on the inner peripheral side of the phase insulation paper 62 are extended and press-formed, the phase insulation paper 62 is formed together with the W phase coils 536 and 537, and sandwiched between the V phase coils 527 and 528 and the W phase coils 536 and 537. A mountain fold is made in the flat portion 621 along line B of the nose portion 623.

The coil ends of the V phase coil 527 and 528 are formed relatively planar at the portion in the circumferential direction of the stator core 40, but then greatly deform three-dimensionally at the portion where they rise from the slots 13 and 14. Here, the nose portions 623 and 624 are provided on the phase insulation paper 62 taking into account in advance the shape of the rising portion of the coil after this kind of three-dimensional deformation, just like the phase insulation paper 60. These nose portions 623 and 624 are also separate members which are extremely rigid, taking into account the fact that they are subject to a large amount of deformation stress. As a result, the phase insulation paper will not become offset or damaged at the nose portions 623 and 624 during press-forming of the coil ends.

Further, as described above, the V phase coil after being formed is formed farther to the inner peripheral side than the U phase coil, so it deforms from the portion that rises from the slot earlier tahn the U phase coil does in the circumferential direction of the stator core 40. Therefore, the V phase coil falls on the nose portion 603 of the phase insulation paper 60. Further, the W phase coil after being formed is formed farther to the inner peripheral side than the V phase coil, so it deforms from the portion that rises from the slot even earlier than the V phase coil does in the circumferential direction of the stator core 40.

Here, since the wide nose portion 623 is provided on the phase insulation paper 62 so as to also cover the nose portion 603 of the phase insulation paper 60 taking into account both the shape of the portion of the V phase coil that rises up and the arrangement of the W phase coil on the innermost peripheral side, the coil end of the W phase coil is able to be reliably insulated from the coil end of the V phase coil.

Figure 8:
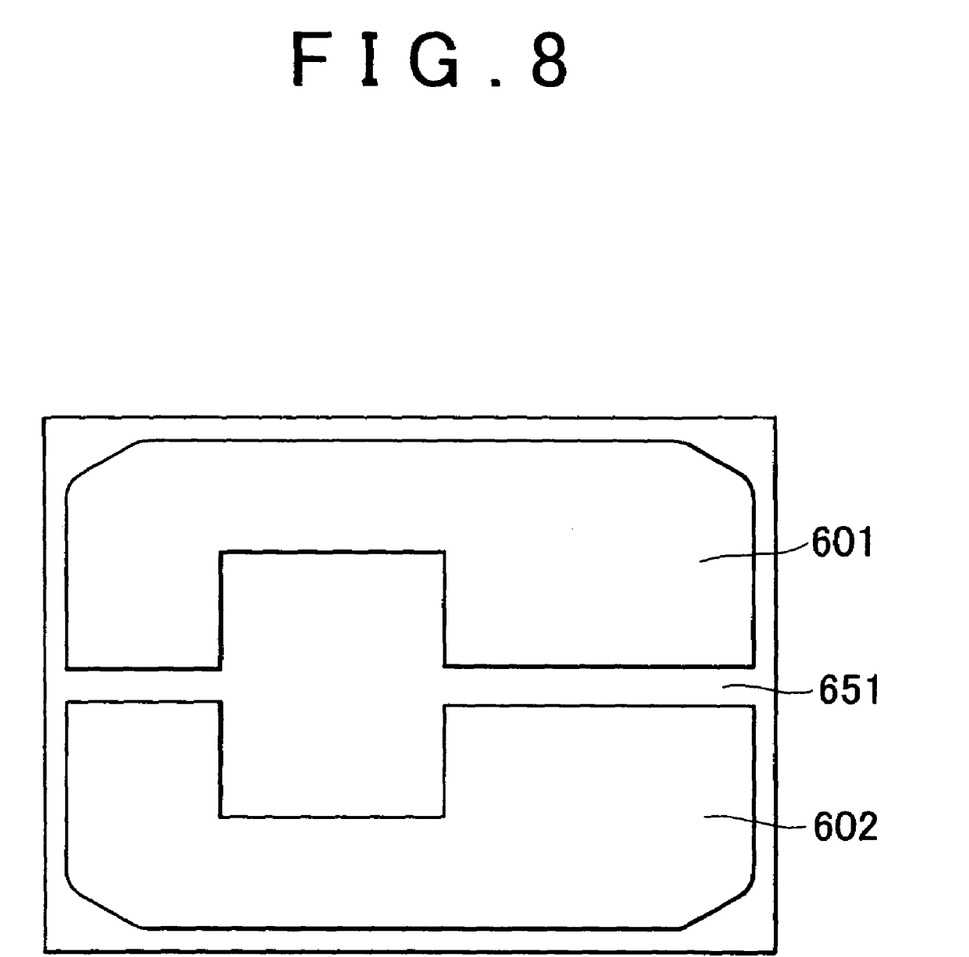
FIG. 8 is a plan view of flat portions shown in FIG. 3 during their manufacture.
Figure 9:
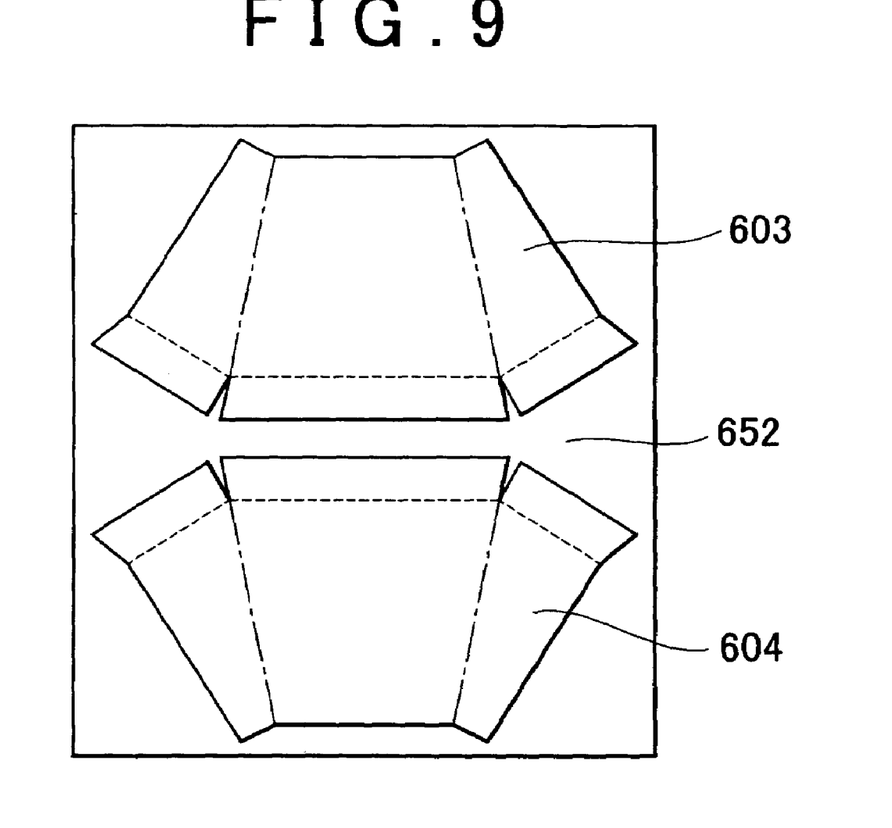
FIG. 9 is a plan view of nose portions shown in FIG. 3 during their manufacture.
Figure 10:
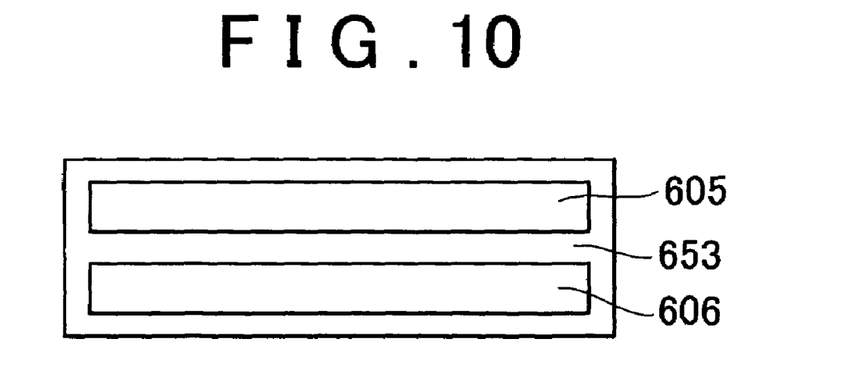
FIG. 10 is a plan view of leg portions shown in FIG. 3 during their manufacture.
Figure 11:
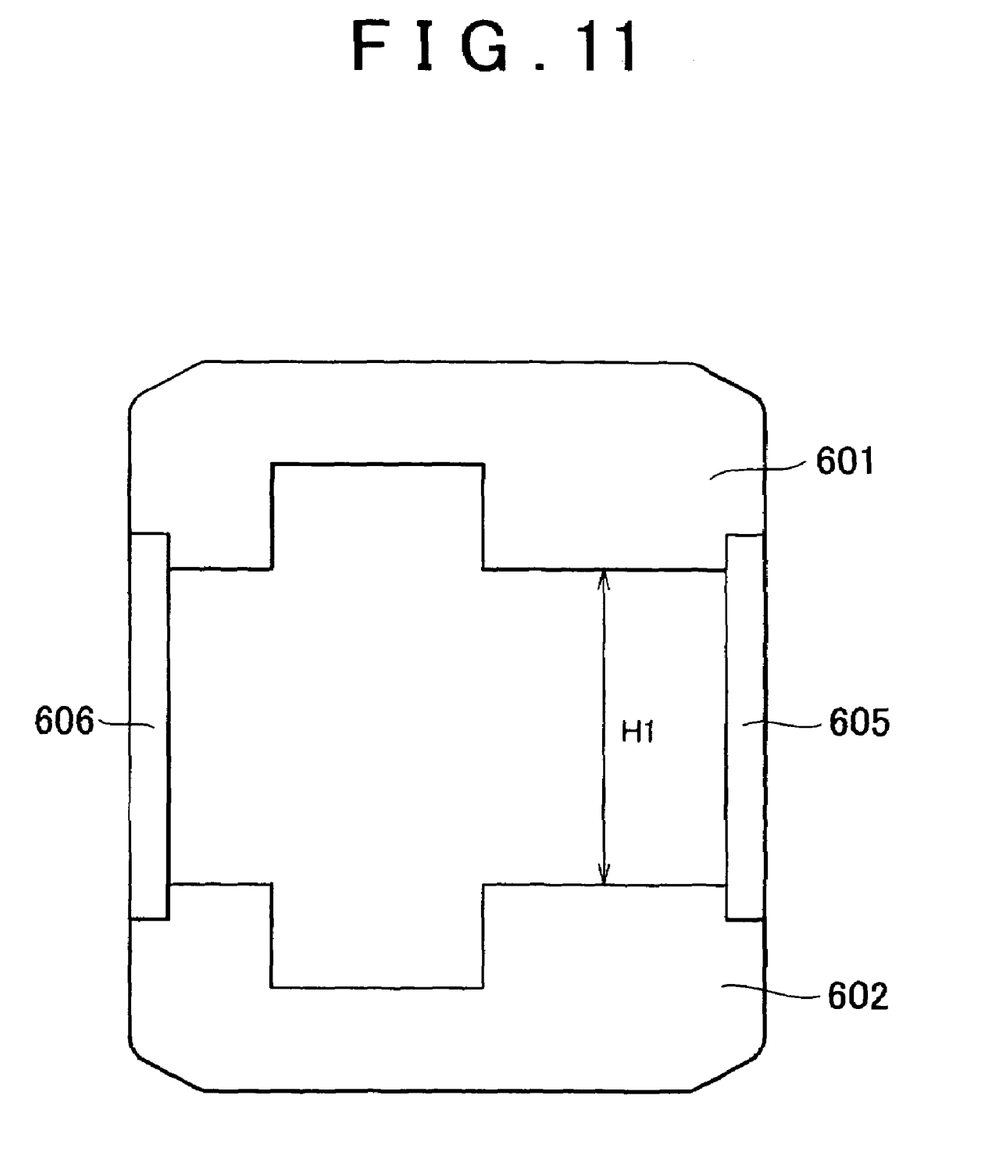
FIG. 11 is a first process drawing illustrating a manufacturing method of a phase insulation sheet formed by the flat portions and the leg portions shown in FIGS. 8 and 10, respectively.
Figure 12:
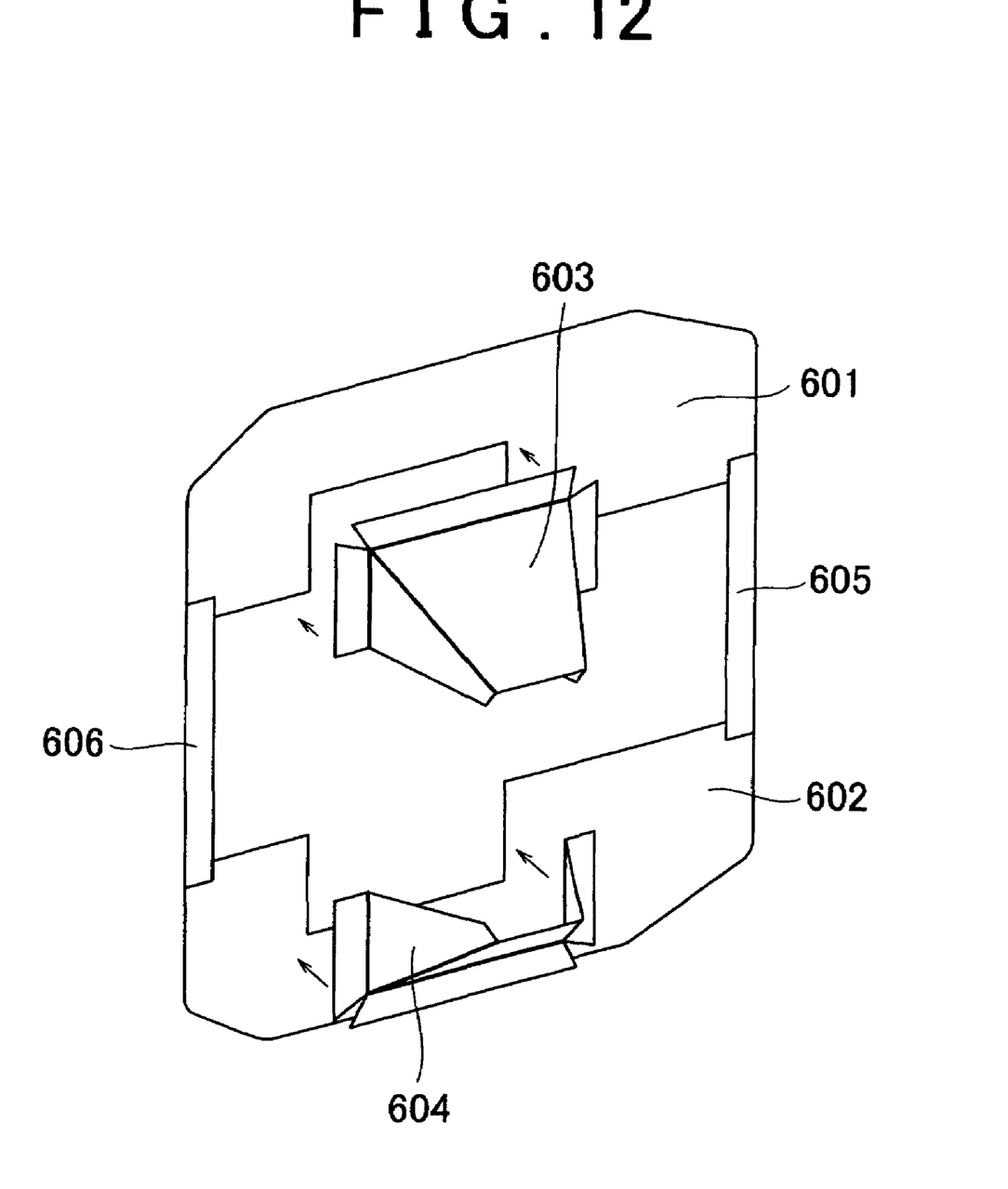
FIG. 12 is a second process drawing illustrating a manufacturing method of the phase insulation sheet formed by the flat portions, the nose portions, and the leg portions shown in FIGS. 8 to 10, respectively.

FIGS. 8 to 12 are views to facilitate understanding of the manufacturing method of the phase insulation papers 60 and 64 shown in FIG. 3. FIG. 8 is a plan view showing the flat portions 601 and 602 shown in FIG. 3 during manufacture. FIG. 9 is a plan view of the nose portions 603 and 604 shown in FIG. 3 during manufacture. FIG. 10 is a plan view of the leg portions 605 and 606 shown in FIG. 3 during manufacture. Also, FIGS. 11 and 12 are first and second process drawings, respectively, showing the manufacturing method of the phase insulation paper 60 formed by the flat portions 601 and 602 shown in FIG. 8, the nose portions 603 and 604 shown in FIG. 9, and the leg portions 605 and 606 shown in FIG. 10.

Referring to FIGS. 8 to 10, the flat portions 601 and 602 are formed by being punched out of a sheet of PET resin 651. A rectangular portion is cut out of each of the flat portions 601 and 602. The nose portions 603 and 604 are formed by being punched out of a sheet of extremely rigid PET resin 652 that is thicker than the PET resin 651. Valley folds are then made along the broken lines and mountain folds are made along the chained line. The leg portions 605 and 606 are formed by being punched out of a sheet of PET resin 653 that is thinner than the PET resin 651.

Referring to FIG. 11, after forming the flat portions 601 and 602 from the PET resin 651 and the leg portions 605 and 606 from the PET resin 653, one end of the leg portion 605 is bonded to one end of the flat portion 601 and the other end of the leg portion 605 is bonded to one end of the flat portion 602. Similarly, one end of the leg portion 606 is bonded to the other end of the flat portion 601 and the other end of the leg portion 606 is bonded to the other end of the flat portion 602. The flat portions 601 and 602 are arranged so that their cutout portions face one another and the gap between the flat portions 601 and 602 is the gap H1 corresponding to the length, in the rotational axis direction, of the stator core 40. Bonding is done using a thermo-compression sheet or adhesive tape or the like which has sufficient adhesive force.

Referring to FIG. 12, after the leg portions 605 and 606 have been bonded to the flat portions 601 and 602, the nose portions 603 and 604 are then bonded to the flat portions 601 and 602, respectively, at the cutout portions. Bonding is done using a thermo-compression sheet or adhesive tape or the like which has sufficient adhesive force, just like the bonding of the leg portions 605 and 606 to the flat portions 601 and 602.

Accordingly, the flat portions 601 and 602, the nose portions 603 and 604, and the leg portions 605 and 606 of the phase insulation papers 60 and 64 are each separate members, which makes it possible to select the material rigidity and thickness appropriate for each portion of the phase insulation papers 60 and 64.

Here, if the thickness of the leg portions 605 and 606 does not pose a large problem with respect to the coil lamination factor in the slot, the flat portions 601 and 602 and the leg portions 605 and 606 can also be integrally formed from the PET resin 651. In this case, the nose portions 603 and 604 can be formed from the unused area surrounded by the flat portions 601 and 602 and the leg portions 605 and 606, which would improve the manufacturing yield.

In this exemplary embodiment, however, the nose portions 603 and 604 are made as separate members from the flat portions 601 and 602 and the leg portions 605 and 606 in order to increase rigidity, and so are unable to be made from the unused area. Unless the nose portions 603 and 604 are able to be made from the unused area, forming the flat portions 601 and 602 and the leg portions 605 and 606 integrally would reduce the yield drastically.

In contrast, the yield is greater when the leg portions 605 and 606 and the flat portions 601 and 602 are formed separately and then bonded them together, as shown in FIGS. 8 to 10, than when the flat portions 601 and 602 and the leg portions 605 and 606 are formed integrally. The bonded structure described above is also favorable because the rigidity and thickness of the member of each portion, including the nose portions 603 and 604, can be designed appropriately.

In the foregoing description, the leg portions 605 and 606 are bonded to the flat portions 601 and 602 first and the nose portions 603 and 604 are then bonded to the flat portions 601 and 602. Alternatively, however, the order in which the leg portions 605 and 606 and the nose portions 603 and 604 are bonded to the flat portions 601 and 602 may also be reversed.

Although not particularly shown in the drawings, the manufacturing method of the phase insulation papers 62 and 66 shown in FIG. 4 is the same as the manufacturing method of the phase insulation papers 60 and 64 described above.

As described above, according to this exemplary embodiment, the phase insulation papers 60 and 64 (62 and 66) are provided with the nose portions 603 and 604 (623 and 624) which have a higher rigidity than do the flat portions 601 and 602 (621 and 622) considering the distortion shape of the coil ends during press-forming. This inhibits the phase insulation papers 60 and 64 (62 and 66) from becoming offset or damaged during press-forming. Accordingly, the electric motor 100 is able to be made more compact while ensuring the quality of insulation therein. In addition, the manufacturing yield during press-forming is also able to be improved.

Further, the leg portions 605 and 606 (625 and 626) are made of thinner material than the flat portions 601 and 602 (621 and 622). As a result, the leg portions 605 and 606 (625 and 626) do not impair the lamination factor of the stator coil filled in the slot. Accordingly, using the phase insulation papers 60 and 64 (62 and 66) will help to keep the performance of the electric motor 100 from degrading.

Also according to this exemplary embodiment, the flat portions 601 and 602 (621 and 622) and the nose portions 603 and 604 (623 and 624) are made with the same material, but the nose portions 603 and 604 (623 and 624) are thicker than the flat portions 601 and 602 (621 and 622). This makes it possible to ensure the rigidity of the nose portions 603 and 604 (623 and 624). Accordingly, material costs can be reduced by using the same material for the members that make up the phase insulation papers 60 and 64 (62 and 66).

Also according to this exemplary embodiment, the width of the nose portions 623 and 624 of the phase insulation papers 62 and 66, which are upper layers when the coil ends are press-formed, are made wider than the nose portions 603 and 604 of the phase insulation papers 60 and 64, which are lower layers when the coil ends are press-formed, taking into account the coil end shape of each phase coil during press-forming. As a result, the highly rigid nose portions 623 and 624 can be reliably placed at portions that deform greatly. Accordingly, the electric motor 100 which includes three phases can be made more compact while more reliably ensuring the insulation quality.

In the foregoing exemplary embodiment, the flat portions 601 and 602 (621 and 622) and the nose portions 603 and 604 (623 and 624) are made with the same material (i.e., with the same PET resin), but the nose portions 603 and 604 (623 and 624) are thicker than the flat portions 601 and 602 (621 and 622) for increased rigidity. Alternatively, however, a member of different material which has higher rigidity than the PET resin used for the flat portions 601 and 602 (621 and 622) may be used for the nose portions 603 and 604 (623 and 624).

In this case, it is not always necessary that the thickness of the members that make up the nose portions 603 and 604 (623 and 624) be greater than the thickness of the members that make up the flat portions 601 and 602 (621 and 622); in fact, it can be thinner than the flat portions 601 and 602 (621 and 622). This makes it possible to further inhibit the phase insulation papers 60 and 64 (62 and 66) from becoming offset at the nose portions 603 and 604 (623 and 624). Also, the amount that the phase insulation papers 60 and 64 (62 and 66) stick out from the coil ends is suppressed, thus enabling the electric motor 100 to be made even more compact.

Also, the material of the leg portions 605 and 606 (625 and 626) does not need to be the same material as that of the flat portions 601 and 602 (621 and 622) and the nose portions 603 and 604 (623 and 624).

Further, in the foregoing exemplary embodiment, the phase insulation papers 60 to 66 are made of the PET resin. However, the material of the phase insulation papers is not limited in this invention to being PET resin. For example, the phase insulation papers 60 to 66 may be made of another material that has excellent insulation properties, a constant heat resistance, plasticity, and rigidity. The flat portions 601, 602, 621, and 622, the nose portions 603, 604, 623, and 624, and the leg portions 605, 606, 625, and 626 may also be made of, for example, PEN (polyethylene naphthalate), mica, Nomex (R), or a sheet which combines these in a layered construction.

The electric motor 100 provided with the phase insulation paper according to this invention is preferably used in, for example, a hybrid vehicle or an electric vehicle or the like which have become the focus of much attention in recent years. That is, at a time when there is a great demand for compactness, reliability, and low cost in these kinds of vehicle systems, this electric motor 100 helps to make the vehicles more compact because the electric motor 100 itself is compact due to the coil ends being press-formed. Also, because the phase insulation paper is provided with the nose portions and the rigidity thereof is further increased, poor phase insulation of the coil ends in the electric motor 100 is able to be minimized, thereby improving reliability of the vehicle. Moreover, this electric motor 100 improves the manufacturing yield as described above, and thereby contributes to reducing vehicle costs.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A phase insulation paper that insulates two adjacent phases of coil ends formed by a plurality of stator coils at an end face of a stator core in a rotational axis direction, comprising:
    a three-dimensional portion provided corresponding to a first portion near where the coil ends enter/exit the stator core, the three-dimensional portion having a three-dimensional shape corresponding to the shape of the first portion when the coil ends have been press-formed to the end face; and
    a flat portion provided corresponding to a second portion of the coil ends in a direction away from the stator core,
    wherein the flat portion is formed of a first member and the three-dimensional portion is formed of a second member of higher rigidity than the first member.

2. The phase insulation paper according to claim 1, wherein
    the second member is made of the same material as the first member and is thicker than the first member.

3. The phase insulation paper according to claim 1, wherein
    the second member is different than the first member, is made of a material that is more rigid than the first member, and is thinner than the first member.

4. A phase insulation paper that insulates two adjacent phases of coil ends formed by a plurality of stator coils at both end faces of a stator core in a rotational axis direction, comprising:
    a first flat portion and a first three-dimensional portion provided corresponding to the coil ends at one of the end faces, the first flat portion being formed from a first member and the first three-dimensional portion being formed from a second member that is more rigid than the first member;
    a second flat portion and a second three-dimensional portion provided corresponding to the coil ends at the other end face, the second flat portion being formed from the first member and the second three-dimensional portion being formed from the second member; and
    a connecting portion that connects the first flat portion and the second flat portion together and which is inserted into a slot of the stator core,
    wherein the first three-dimensional portion and the second three-dimensional portion are both provided corresponding to a first portion near where the corresponding coil ends enter/exit the stator core, the first three-dimensional portion and the second three-dimensional portion both having a three-dimensional shape that corresponds with the shape of the first portion when the corresponding coil ends have been press-formed to the corresponding end face, and
    wherein the first flat portion and the second flat portion are both provided corresponding to a second portion of the corresponding coil ends in a direction away from the stator core.

5. The phase insulation paper according to claim 4, wherein
    the connecting portion is formed of a third member which is thinner than the first member.

6. The phase insulation paper according to claim 4, wherein
    the second member is formed of the same material as the first member and is thicker than the first member.

7. The phase insulation paper according to claim 4, wherein
    the second member is different than the first member, is formed of material that is more rigid than the first member, and is thinner than the first member.

8. An electric motor comprising:
    a stator;
    a plurality of stator coils, each stator coil being provided corresponding to a respective one of a plurality of phases and being wound around the stator; and
    a plurality of phase insulation papers, each of which is inserted between adjacent stator coils, and which is the phase insulation paper according to claim 1.

9. The electric motor according to claim 8, wherein
    the plurality of phase insulation papers includes a first phase insulation paper and a second phase insulation paper;
    the first phase insulation paper is arranged above the second phase insulation paper when coil ends formed by the plurality of stator coils at an end face of the stator core in the rotational axis direction are press-formed to the end face; and
    a three-dimensional portion of the first phase insulation paper is wider than a three-dimensional portion of the second phase insulation paper.

10. An electric motor comprising:
    a stator;
    a plurality of stator coils, each stator coil being provided corresponding to a respective one of a plurality of phases and being wound around the stator; and
    a plurality of phase insulation papers, each of which is inserted between adjacent stator coils, and which is the phase insulation paper according to claim 4.

11. The electric motor according to claim 10, wherein
the plurality of phase insulation papers includes a first phase insulation paper and a second phase insulation paper;
the first phase insulation paper is arranged, on an end face, in a rotational axis direction, of a stator core, above the second phase insulation paper when the coil ends formed by the plurality of stator coils are press-formed to the end face; and
a three-dimensional portion of the first phase insulation paper is wider than a three-dimensional portion of the second phase insulation paper.

* * * * *